US008739420B2

(12) United States Patent
Tarizzo

(10) Patent No.: US 8,739,420 B2
(45) Date of Patent: Jun. 3, 2014

(54) MACHINE BED FOR A CO-ORDINATE MEASURING MACHINE

(75) Inventor: Alberto Tarizzo, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 421 days.

(21) Appl. No.: 12/992,776

(22) PCT Filed: May 16, 2008

(86) PCT No.: PCT/IT2008/000331
§ 371 (c)(1),
(2), (4) Date: Mar. 9, 2011

(87) PCT Pub. No.: WO2009/139014
PCT Pub. Date: Nov. 19, 2009

(65) Prior Publication Data
US 2011/0296701 A1    Dec. 8, 2011

(51) Int. Cl.
*G01B 5/008* (2006.01)
(52) U.S. Cl.
USPC ............................................................ 33/503
(58) Field of Classification Search
USPC .................. 33/503, 556, 557, 559, 1 M
See application file for complete search history.

(56) References Cited

U.S. PATENT DOCUMENTS

| | | | |
|---|---|---|---|
| 4,763,420 A | 8/1988 | McCabe et al. | |
| 5,063,683 A | 11/1991 | Bury | |
| 5,291,662 A * | 3/1994 | Matsumiya et al. | 33/503 |
| 5,446,971 A * | 9/1995 | Neumann | 33/702 |
| 5,987,768 A * | 11/1999 | Freitag et al. | 33/706 |
| 6,161,294 A * | 12/2000 | Bland et al. | 33/1 M |
| 6,817,104 B2 * | 11/2004 | Kaneko et al. | 33/1 M |
| 7,114,265 B2 * | 10/2006 | Mies | 33/503 |
| 7,222,434 B2 * | 5/2007 | Kikuchi | 33/503 |
| 7,316,072 B2 * | 1/2008 | Park et al. | 33/1 M |
| 7,726,035 B2 * | 6/2010 | Chang et al. | 33/551 |
| 2003/0213135 A1 * | 11/2003 | Kaneko et al. | 33/1 |
| 2004/0205974 A1 * | 10/2004 | Ogura | 33/503 |
| 2011/0296701 A1 * | 12/2011 | Tarizzo | 33/503 |
| 2012/0167402 A1 * | 7/2012 | Verdi et al. | 33/503 |

FOREIGN PATENT DOCUMENTS

| | | |
|---|---|---|
| CN | 200998810 Y | 1/2008 |
| EP | 1335180 | 8/2003 |
| GB | 2080954 A | 2/1982 |

OTHER PUBLICATIONS

CN Office Action dated Nov. 14, 2012 as received in Application No. 200880130032.6.

* cited by examiner

*Primary Examiner* — Yaritza Guadalupe-McCall
(74) *Attorney, Agent, or Firm* — Maschoff Brennan

(57) ABSTRACT

A co-ordinate measuring machine (1) comprising a machine bed (2) provided with guides along a first axis, and a mobile unit (4) comprising at least one main carriage (5) mobile along the guides (16*a*, 16*b*, 16*c*); the machine bed (2) comprises a closed perimetral metal frame (15) provided with guides (16*a*, 16*b*, 16*c*) and a worktable (17) housed within the frame (15); the worktable (17) and the frame (15) are constrained to one another by constraint means (35) that uncouple the deformations thereof.

14 Claims, 6 Drawing Sheets

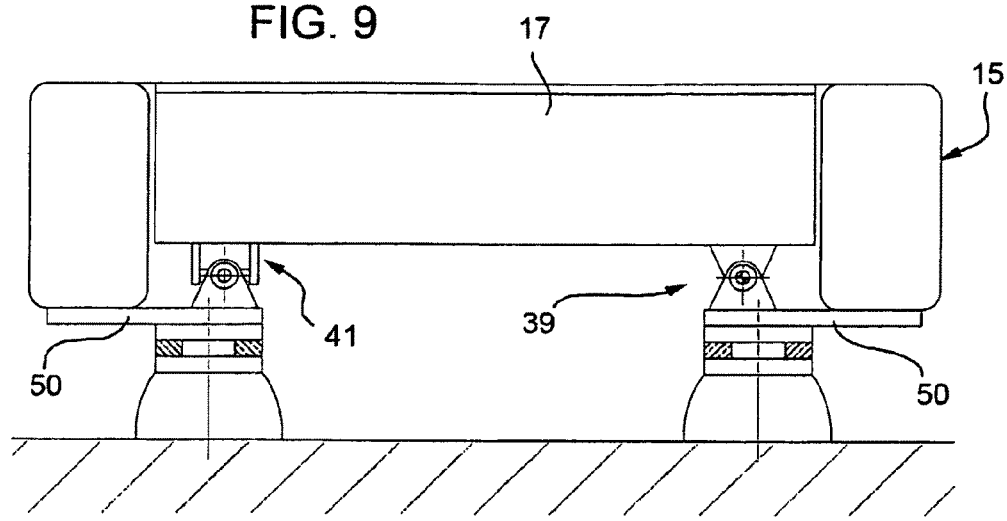
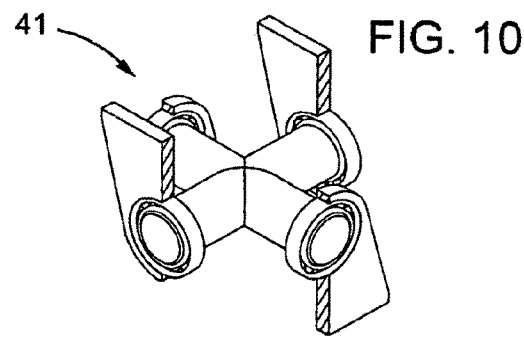
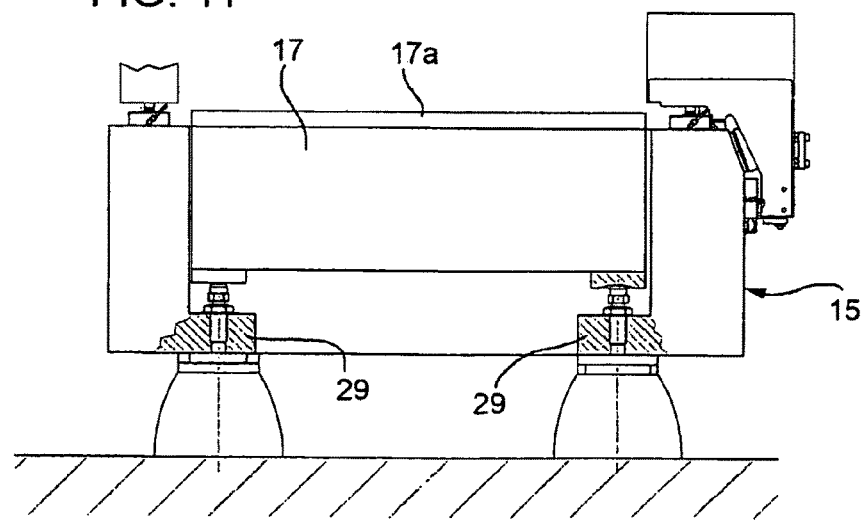

MACHINE BED FOR A CO-ORDINATE MEASURING MACHINE

TECHNICAL FIELD

The present invention relates a co-ordinate measuring machine.

BACKGROUND ART

As is known, co-ordinate measuring machines generally comprise a machine bed designed to support the piece to be measured and a mobile unit for moving a measuring sensor with respect to the machine bed.

More in particular, the mobile unit generally comprises a first carriage that is mobile on the machine bed along guides parallel to a first axis, a second carriage carried by the first carriage and mobile along a second axis orthogonal to the first axis, and a third carriage carried by the second carriage and mobile with respect to this along a third axis orthogonal to the first two axes. The measuring sensor is carried by the third carriage.

In machines of the type briefly described above, the machine bed is normally made of granite, and has the dual purpose of supporting the piece and of defining the guides for the first carriage.

This entails different drawbacks.

In the first place, the positioning of the piece on the machine bed, particularly in the case where the weight of the piece is considerable, leads to a deformation of the machine bed itself, which causes a deformation of the guides and thus induces errors of measurement.

In addition, the movement of the carriages of the mobile unit along the guides, and in particular of the main carriage, induces deformations on the machine bed and thus alters the position of the piece. This thus determines further errors of measurement.

Other drawbacks connected with the use of machine beds made of granite are represented by the cost, the weight, and the difficulty of supply of the granite in a short time.

To solve at least partially the problems linked to the weight of the piece, solutions have been proposed in which the granite bed is uncoupled from the supporting structure.

Illustrated in WO 89/03505 is a measuring machine comprising a metal base carrying the guides for the mobile unit and resting on which is a worktable made of granite.

Illustrated in the document No. GB-A-2080954 is a measuring machine in which a worktable made of hard material is constrained to an underlying metal base provided with guides for the mobile unit via positioning elements without play and such as not to transmit stresses.

Both of the solutions described above of a machine bed require complex and costly base structures and, in any case, use a granite table, with all the drawbacks that this entails.

DISCLOSURE OF INVENTION

The aim of the present invention is to provide a co-ordinate measuring machine that is free from the drawbacks linked to the known art and discussed above.

The aforesaid purpose is achieved by a co-ordinate measuring machine according to claim 1.

BRIEF DESCRIPTION OF THE DRAWINGS

For a better understanding of the present invention described by way of non-limiting example in what follows are some preferred embodiments, with reference to the attached drawings, in which:

FIG. 9 is a cross section, similar to that of FIG. 5, of a machine bed of a third embodiment of the invention;

FIG. 10 is a perspective view and in partial cross section of a detail of FIG. 9; and FIG. 11 is a cross section, similar to that of FIG. 5, of a machine bed of a fourth embodiment of the invention.

BEST MODE FOR CARRYING OUT THE INVENTION

Figure 1:
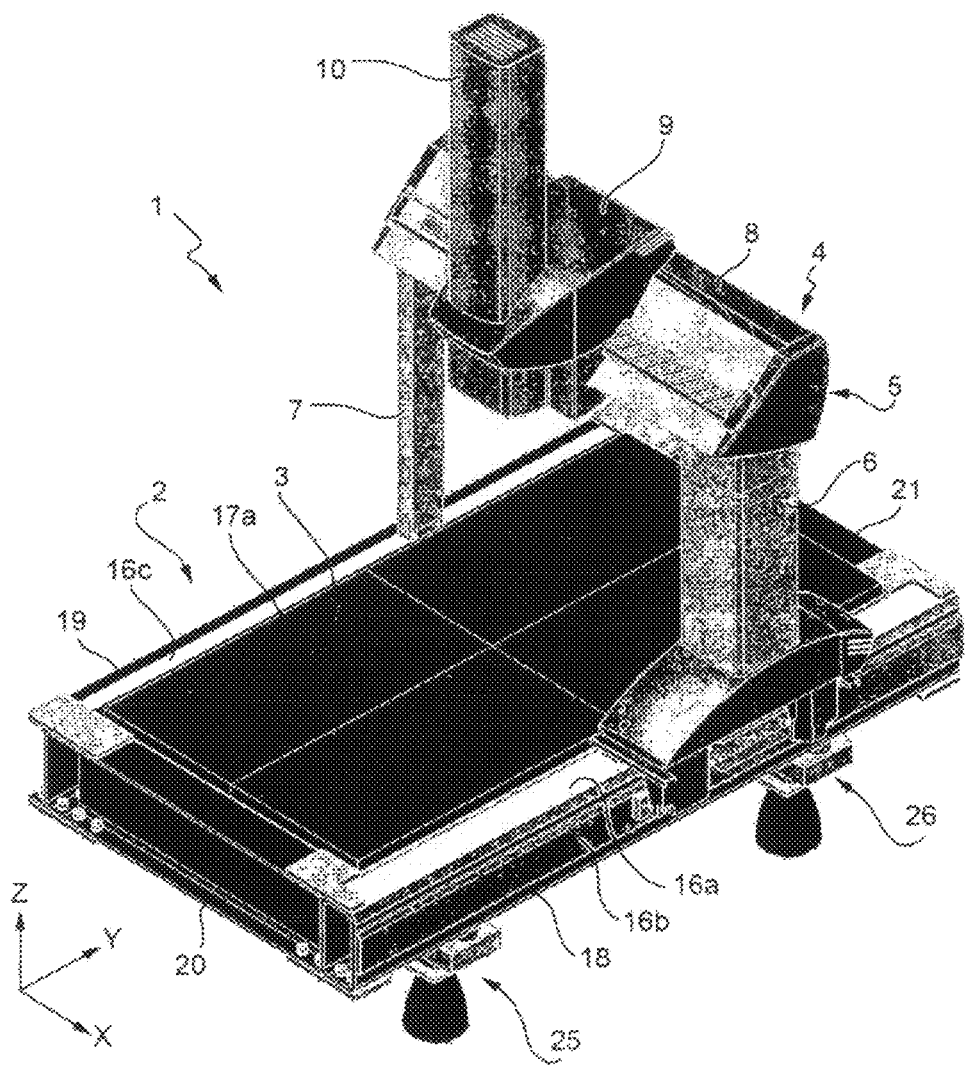
FIG. 1 is a perspective view of a co-ordinate measuring machine according to the present invention.

With reference to FIG. 1, designated as a whole by 1 is a bridge measuring machine.

The machine 1 comprises a machine bed 2 provided with a horizontal working surface 3 designed to support an object to be measured (not illustrated), and a unit 4 that is mobile with respect to the machine bed 2 according to co-ordinate axes.

The unit 4 comprises a main bridge carriage 5 (in what follows, for reasons of brevity referred to as "bridge 5"), which is mobile with respect to the machine bed 2 along a horizontal axis Y. The bridge 5 is provided with a pair of uprights 6 and 7 and a cross member 8 extending between the uprights 6 and 7 in a direction parallel to a horizontal axis X perpendicular to the axis Y.

The unit 4 moreover comprises a secondary carriage 9, carried by the cross member 8 and mobile on the cross member itself along the axis X, and a measuring column 10, carried by the carriage 9 and mobile with respect thereto along a vertical axis Z orthogonal to the axes X and Y.

Mounted on a bottom end of the column 10 is a probe member (not illustrated), possibly via a two-axes articulation device (not illustrated either).

The bridge 5, the carriage 9, and the column 10 are mobile under the control of respective electric motors (not illustrated), which are in turn controlled by a measuring and control unit (not illustrated). The latter is connected to position transducers (not illustrated) associated to the machine axes and to the probe member so as to receive from the latter enable signals for acquisition of the instantaneous co-ordinates of the machine axes.

Figure 2:
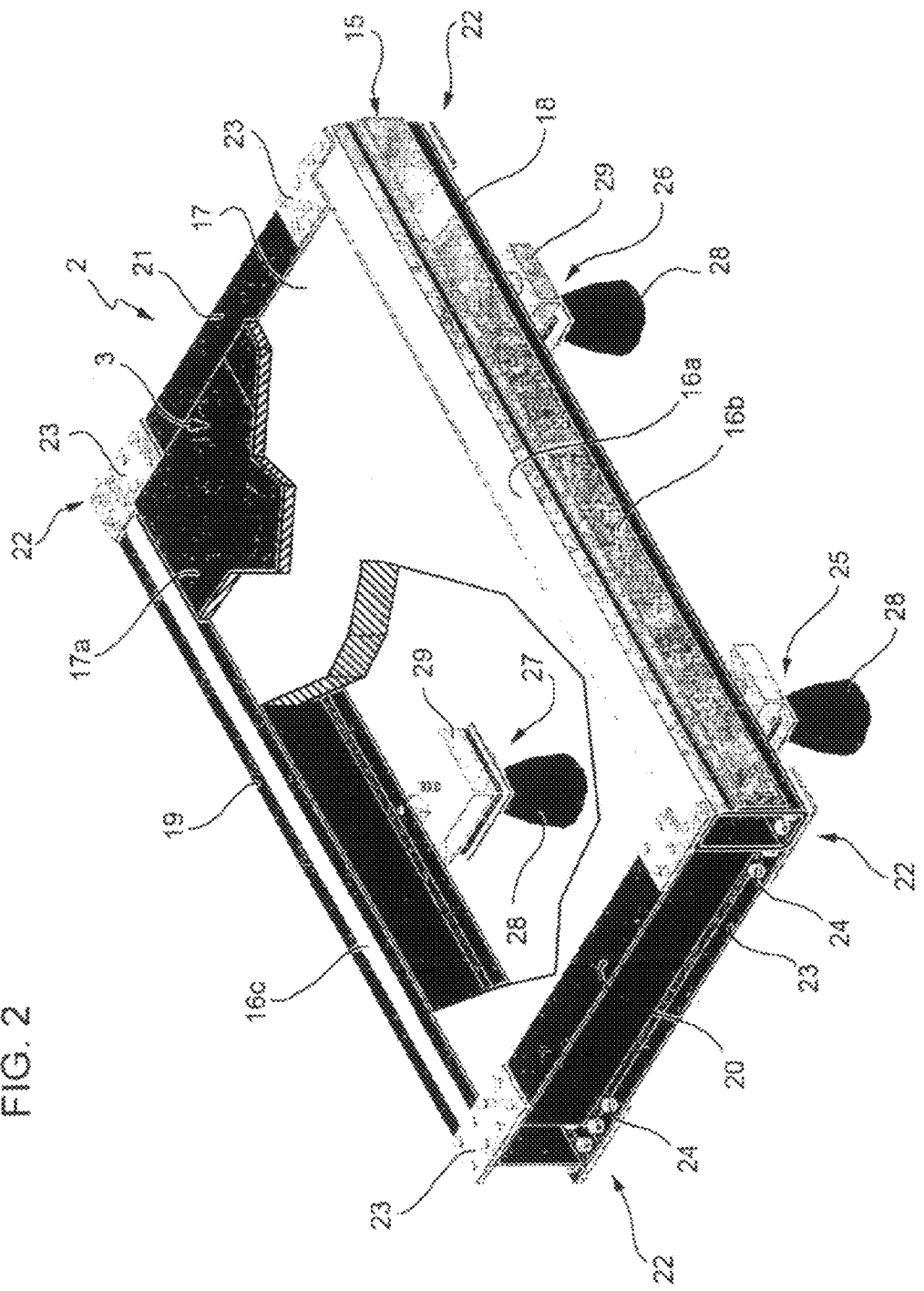
FIG. 2 is a perspective view of a bed of the machine of FIG. 1, with parts removed for clarity.
Figure 3:
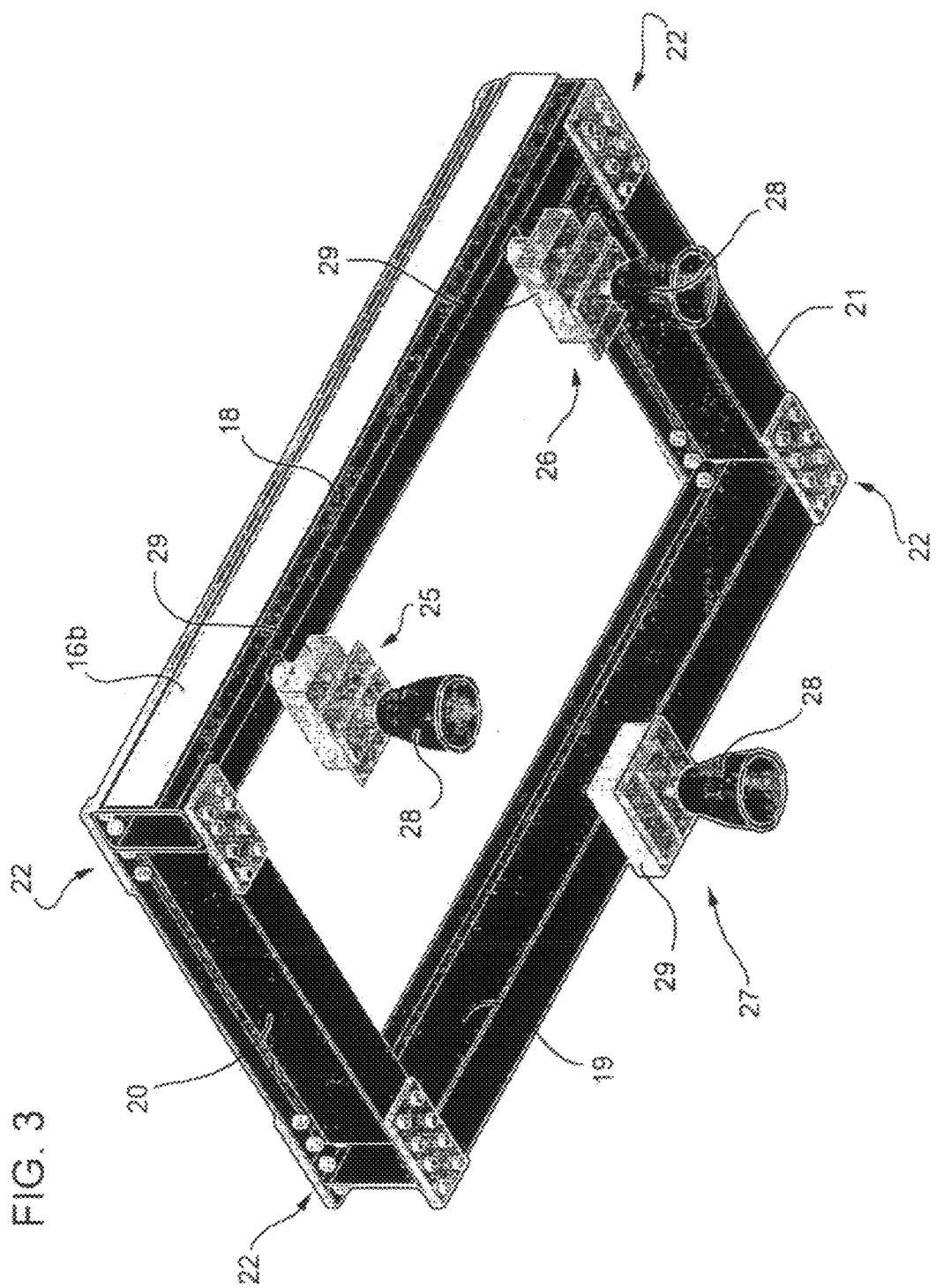
FIG. 3 is a perspective view from beneath of the machine bed of FIG. 2.
Figure 4:
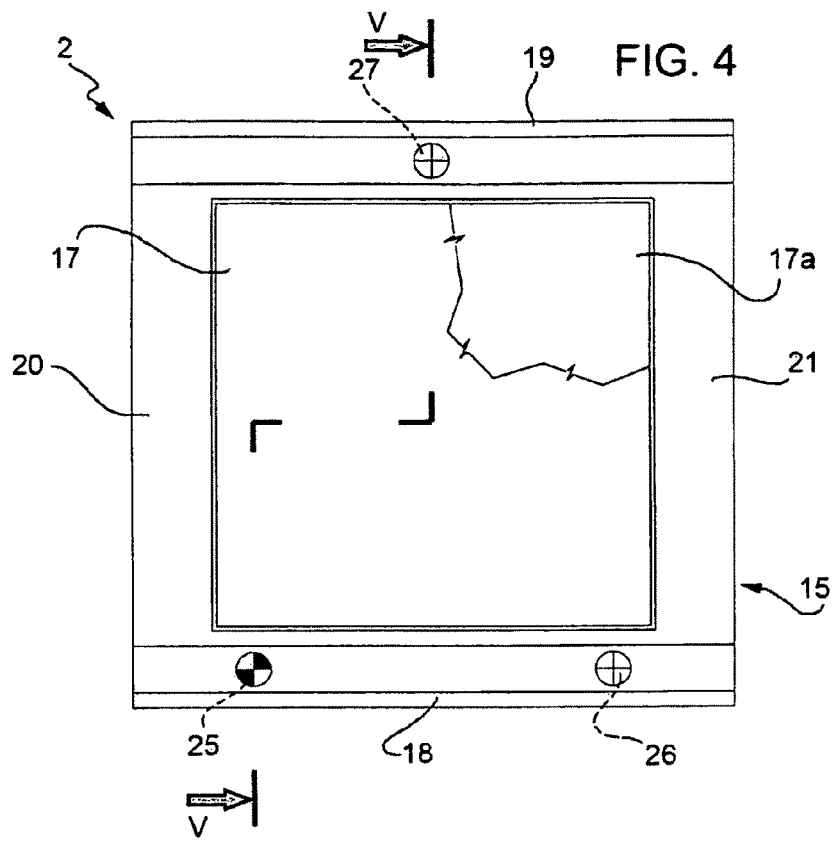
FIG. 4 is a schematic plan view of the machine bed of FIG. 2.

Illustrated in greater detail in FIGS. 2 and 3 is the machine bed 2.

The machine bed 2 basically comprises a rectangular metal frame 15 defining guides 16a, 16b, 16c for the bridge 5 parallel to the axis Y, and a worktable 17 conveniently made of concrete, housed within the frame 15.

More in particular, the frame 15 comprises a pair of longitudinal section elements 18, 19 parallel to the axis Y and a pair of transverse section elements 20, 21 parallel to the axis X.

The section elements 18, 19, 20, 21 are connected to one another at the edges of the frame 15 via connection assemblies of a conventional type, comprising for example gusset plates 23 and connection screws 24.

The section elements 19, 20 and 21 conveniently have an I section. The section element 18 conveniently has a hollow rectangular cross section and carries a top guide 16a and a side guide 16b; the third guide 16c is carried at the top by the section element 19.

The worktable 17 is housed with lateral play within the frame 15 and is conveniently coated by a top layer 17a of granite defining the working surface 3 of the measuring machine 1.

The frame 15 and the worktable 17 are supported by three common supports 25, 26, 27, two of which are arranged in the proximity of the ends of the section element 18, and one in the middle of the section element 19.

Figure 5:
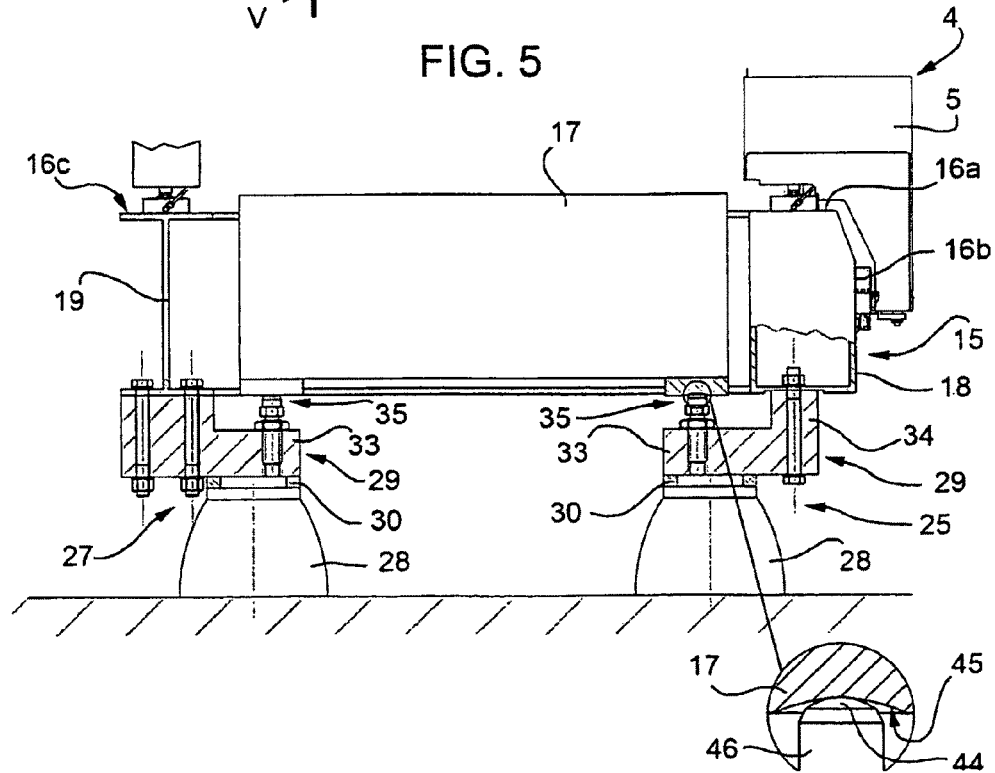
FIG. 5 is a cross section according to the line V-V of FIG. 4.

As is clearly illustrated in FIG. 5, the supports 25, 26, 27 each comprise a resting foot 28 and a bracket 29 fixed on the resting foot 28 via a vibration-damping support 30.

The bracket 29, viewed in a direction parallel to the axis Y, is substantially L-shaped, with a horizontal side 33 having one end fixed to the resting foot 28 and a vertical side 34 extending upwards from an opposite end of the horizontal side 33.

The frame 15 is rigidly fixed to the vertical sides 34 of the brackets 29.

The worktable 17 is supported on the horizontal sides 33 of the brackets 29 via constraint means 35 designed to uncouple the deformations of the worktable 17 from those of the frame 15.

Theoretically, to obtain a perfect uncoupling between the worktable 17 and the frame 15, it is necessary for the constraint means 35 to be statically determined. In practice, if the relative translations between the worktable 17 and the frame 15 may be considered negligible, the constraint means 35 can be statically indetermined, for example as illustrated in FIG. 5 and described in greater detail in what follows, provided that they enable at least relative rotations.

With reference to the enlarged detail of FIG. 5, each of the constraint means 35 can be constituted, for example, by a convex spherical surface 44 fixed with respect to a respective bracket and by a concave spherical surface 45 fixed with respect to the worktable 17 and having a radius of curvature greater than that of the convex spherical surface 44. There is thus prevented any relative translation, but not relative rotation.

The convex spherical surface 44 is conveniently defined by a top terminal surface of a post 46 fixed to the bracket 29, preferably in an axially adjustable way in a vertical direction.

In the case where the relative translations cannot be considered negligible, it is necessary to provide a statically determined system of constraint.

In general, a statically determinate system of constraints is such if it eliminates all and only the six degrees of freedom of relative motion between the worktable 17 and the frame 15. To eliminate the six degrees of freedom, in general three constraints must be used: one constraint eliminates three degrees of freedom, one eliminates two degrees of freedom, and the third eliminates the remaining degree of freedom.

Examples of statically determined constraints will be provided in what follows, with reference to the embodiments described in FIGS. 6 to 11.

Figure 6:
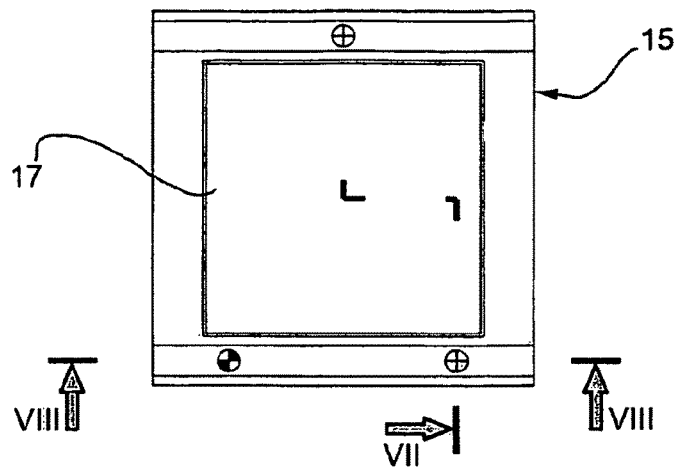
FIG. 6 is a schematic plan view of the machine bed of a second embodiment of the present invention.
Figure 7:
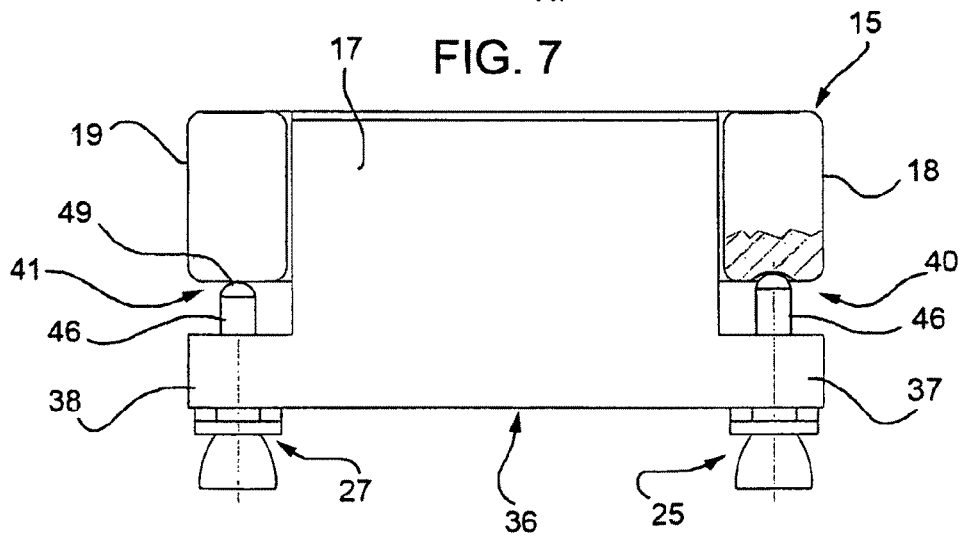
FIG. 7 is a cross section according to the line VII-VII of FIG. 6.
Figure 8:
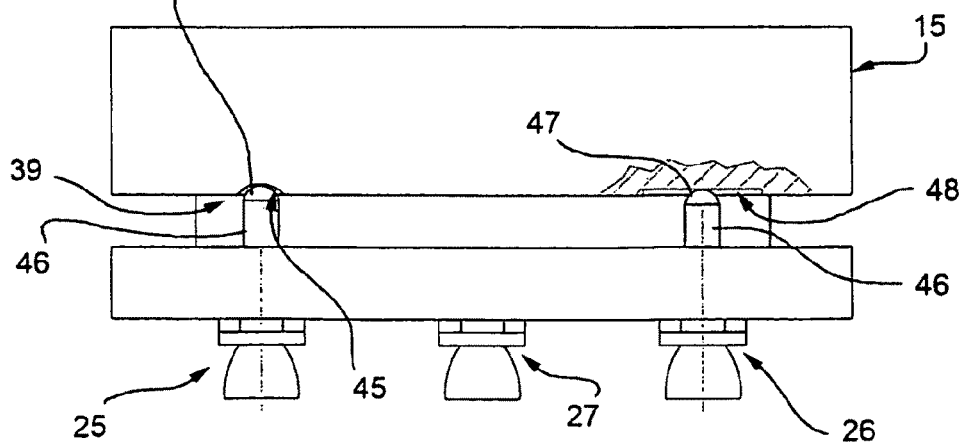
FIG. 8 is a cross section according to the line VIII-VIII of FIG. 6.

Illustrated in FIGS. 6, 7, 8 is a second embodiment of the machine bed 2.

The machine bed 2 comprises yet another rectangular metal frame 15. However, in this case the worktable 17 is constituted by an integral top portion of a base 36 made of concrete having a function also of support for the frame 15.

The base 36 has in fact a pair of bottom side flanges 37, 38 arranged underneath the section elements 18, 19, respectively.

Set between the flanges 37, 38 and the respective section elements 18, 19 are constraint means 35 of a statically determinate type.

According to this embodiment, the constraint means comprise a first articulated constraint 39 arranged on the vertical of the support 25, a second sliding constraint 40 on the vertical of the support 26, and a third simple-bearing constraint 41, arranged on the vertical of the support 27.

The first constraint 39 can be defined, for example, by a convex spherical surface 44 fixed with respect to the base 36, and by a concave spherical surface 45 fixed with respect to the section element 18 of the frame 15 and having a radius of curvature greater than that of the convex spherical surface 44. The latter is conveniently defined by a top terminal surface of a post 46 fixed to the base 36, preferably in an axially adjustable way in a vertical direction. This constraint eliminates three degrees of freedom of translation, but enables relative rotations.

The second constraint 40 can be defined, for example, by a spherical surface 47 co-operating with a groove 48 made underneath the section elements 18 of the frame 15. The groove 48 has a V-shaped concave cross section and extends parallel to the axis Y. This constraint eliminates two degrees of freedom in so far as it prevents any translation in the directions parallel to the axes X and Z.

The third constraint 41 can be defined by a spherical surface 49 fixed with respect to the base 36, on which the section elements 19 of the frame 15 rests. This constraint prevents just the vertical translation.

All the constraints described above are unidirectional as regards the translations in a vertical direction; this is sufficient in so far as the weight of the worktable prevents any relative translations in the direction of detachment between the spherical surfaces.

The spherical surfaces 47, 49 are conveniently defined by respective top terminal surfaces of posts 46 fixed to the base 36, preferably in an axially adjustable way in a vertical direction.

FIGS. 9 and 10 illustrate a variant of the machine bed 2 of FIG. 5 which the brackets 29 are constituted by plane plates 50, the first constraint 39 is constituted by a hinge with horizontal axis parallel to the axis and the third constraint 41 is of a Cardan type; it enables relative rotation about the axis X and the axis Y and relative translation with respect to said axes.

The second constraint 40, not illustrated in detail, can be constituted in this case by a simple rest.

FIG. 11 illustrates a further variant of the solution of FIG. 5, in which the brackets 29 are integral to the frame 15.

From an examination of the characteristics of the machine 1 built according to the present invention, the advantages that it makes possible to achieve are evident.

In the first place, the deformations of the guides due to the variable load exerted by the mobile unit as its position varies and those of the machine bed due to the weight of the piece to be measured are uncoupled thanks to the composite structure of the machine bed.

Uncoupling between the function of guide and the function of support of the piece enables the use of large surfaces of granite, which are costly and difficult to find to be avoided.

Since dimensional stability is not required over time but only in the measuring cycle, the worktable (or the base in the case of the solution of FIGS. 6 to 8) can be made at least prevalently (i.e., except for a possible top coating layer) of a material such as concrete or other non-metallic pourable material, for example a thermoplastic resin containing appropriate fillers, and the frame 15 can be made of metal structural work.

The total cost of the machine bed is consequently much lower, and the weight reduced.

Finally, it is clear that modifications and changes can be made to the machine 1 described, without this implying any departure from the sphere of protection of the claims. In particular, the machine 1 can be of any other type, instead of the bridge type. In particular, the machine 1 can be of the horizontal-arm type; i.e., it comprises a main carriage in the form of a column that is mobile along a longitudinal axis of the machine bed, a secondary carriage that is mobile vertically along the column, and a horizontal measuring arm that is mobile axially along an axis of its own perpendicular to the longitudinal axis of the machine bed.

In addition, the frame 15 can be made with a plurality of beams made of composite or stone material, instead of the metal section elements.

The invention claimed is:

1. A co-ordinate measuring machine comprising:
    a machine bed defining guide means along a first axis; and
    a mobile unit comprising at least one main carriage mobile along said guide means, wherein said machine bed includes a closed perimetral frame provided with said guide means and a worktable at least partially housed within said frame, said worktable and said frame being constrained to one another by constraint means that uncouple deformations thereof, wherein;
    said constraint means are statically determined; and
    said constraint means comprise a first constraint that eliminates three degrees of freedom, a second constraint that eliminates two degrees of freedom, and a third constraint that eliminates one degree of freedom.

2. A co-ordinate measuring machine comprising:
    a machine bed defining guide means along a first axis; and
    a mobile unit comprising at least one main carriage mobile along said guide means, wherein said machine bed includes a closed perimetral frame provided with said guide means and a worktable at least partially housed within said frame, said worktable and said frame being constrained to one another by constraint means that uncouple deformations thereof, wherein said perimetral frame has a rectangular shape, and is constituted by a plurality of beam elements rigidly connected to one another.

3. The machine according to claim 2, wherein said constraint means are statically determined.

4. The machine according to claim 2, wherein translations between the worktable and the frame following upon deformations are negligible, said machine being wherein it comprises a system of statically indeterminate constraint that eliminates the degrees of freedom of translation.

5. The machine according to claim 2, wherein said worktable is made at least prevalently of a pourable non-metal material.

6. The machine according to claim 5, wherein said material is concrete.

7. The machine according to claim 2, wherein said beam elements are metal profiled elements.

8. The machine according to claim 7, wherein brackets are integral to said frame.

9. The machine according to claim 2, wherein said beam elements are made of stone material.

10. The machine according to claim 9, wherein said second material is granite.

11. The machine according to claim 2, wherein said beam elements are made of a composite material.

12. The machine according to claim 2, wherein said worktable is supported via said constraint means by supporting brackets rigidly fixed to said frame.

13. The machine according to claim 2, wherein said worktable is constituted by a top integral portion of a base, said frame being supported by a supporting portion of said base via said constraint means.

14. The machine according to claim 2, wherein it comprises a top layer made of a second material and defining a working surface of said machine.

* * * * *